US007005615B2

(12) United States Patent
Thomas

(10) Patent No.: US 7,005,615 B2
(45) Date of Patent: Feb. 28, 2006

(54) KEEP'N'HEAT

(76) Inventor: Ellen Lelita Thomas, 5630 Vernon Rd., Jacksonville, FL (US) 32209

( * ) Notice: Subject to any disclaimer, the term of this patent is extended or adjusted under 35 U.S.C. 154(b) by 0 days.

(21) Appl. No.: 10/637,926

(22) Filed: Aug. 12, 2003

(65) Prior Publication Data

US 2005/0035109 A1 Feb. 17, 2005

(51) Int. Cl.
A47J 36/24 (2006.01)
A47J 36/26 (2006.01)

(52) U.S. Cl. .............. 219/429; 219/214; 219/432; 219/433; 222/146.5

(58) Field of Classification Search ............... 219/214, 219/385, 428, 429, 432, 433; 222/146.5
See application file for complete search history.

(56) References Cited

U.S. PATENT DOCUMENTS

| 1,120,758 | A | * | 12/1914 | Stirn | 219/218 |
| 1,158,475 | A | * | 11/1915 | Fox | 219/218 |
| 2,061,637 | A | * | 11/1936 | Schulz | 219/452.11 |
| 2,897,330 | A | * | 7/1959 | Hopkins | 219/218 |
| 3,636,299 | A | * | 1/1972 | Stewart, Jr. | 219/201 |
| 5,077,460 | A | * | 12/1991 | Rocha et al. | 219/217 |
| 5,290,997 | A | * | 3/1994 | Lai et al. | 219/218 |
| 5,894,943 | A | * | 4/1999 | Liu | 211/78 |
| 6,186,055 | B1 | * | 2/2001 | DeMars et al. | 99/340 |
| 6,497,305 | B1 | * | 12/2002 | Beach | 186/49 |
| 6,593,552 | B1 | * | 7/2003 | Li | 219/432 |
| 6,705,109 | B1 | * | 3/2004 | DeMars | 62/457.2 |

FOREIGN PATENT DOCUMENTS

GB 1556796 * 11/1979

* cited by examiner

Primary Examiner—Joseph Pelham

(57) ABSTRACT

The food warmer is a subdivided individual sectioned compartments that holds a multiple portion of foods with transparent covers and is operated by a motorized turntable that the foods. The heating is an option of electricity or battery power. The two unit heating system operates from either side of the warmer, independently of sides, with no turntable rotation when this mode is in operation. The temperature is regulated by control led heat settings to keep foods from scorching and warmer safe from overheating. The warmer is compacted to hold most of your needs with ease of access to all selections.

Alternatives are: this warmer has subdivided, individual sectioned compartments that permits more ease to access selections of foods with a turntable that rotates for serving convenience without containers being spread to only select one dish from each.

12 Claims, 3 Drawing Sheets

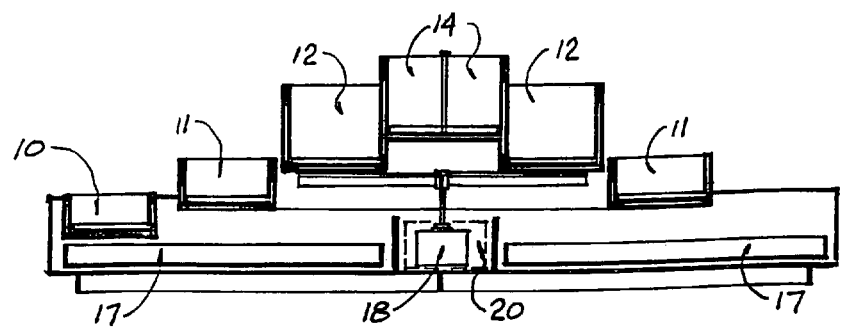
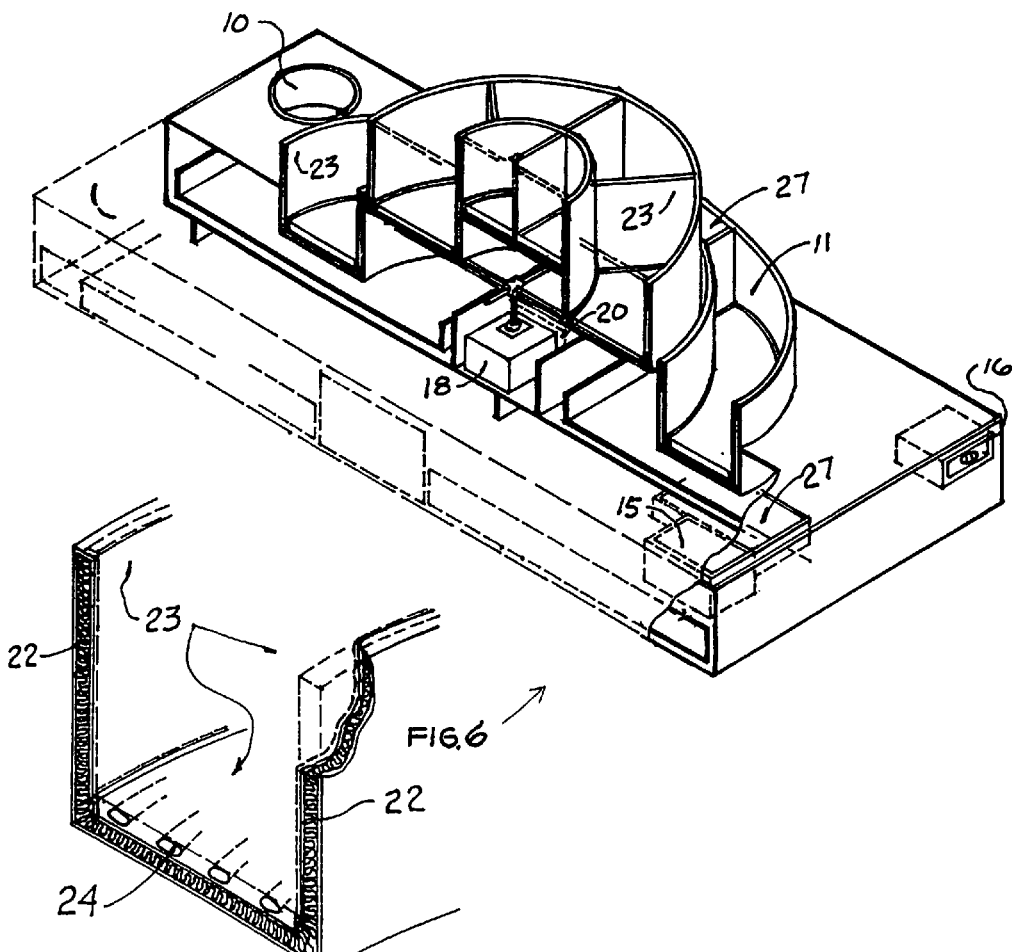

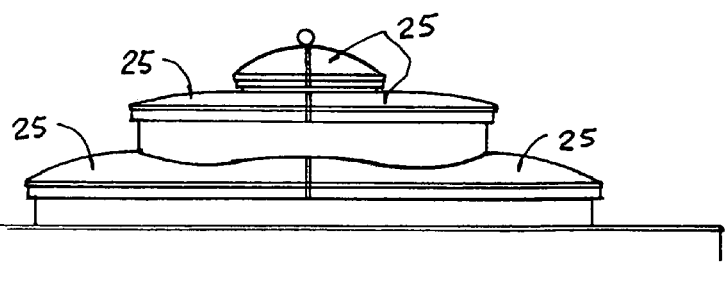
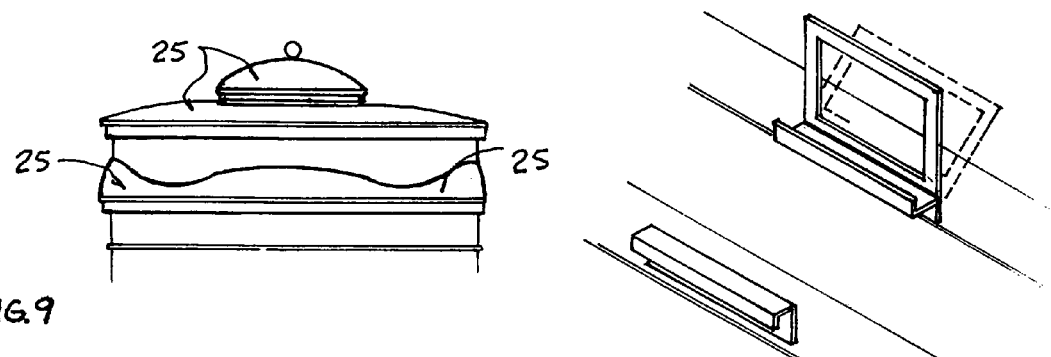
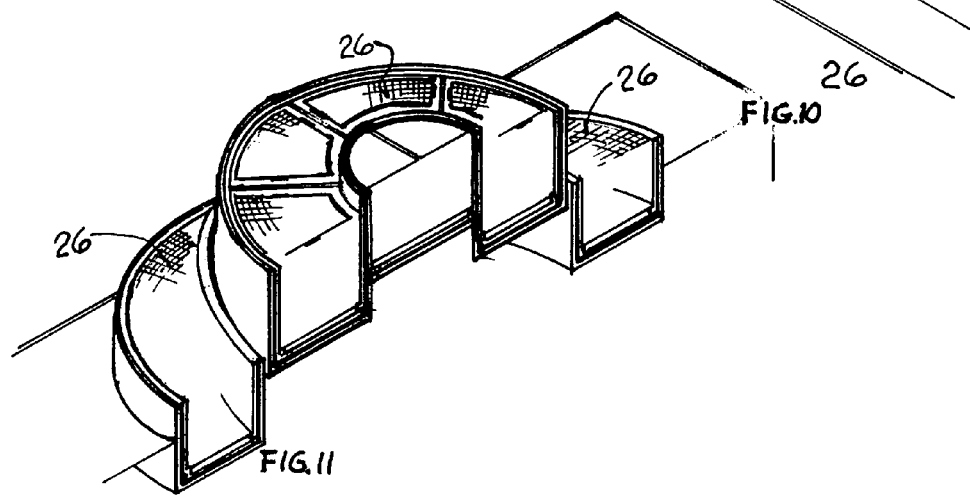

KEEP'N'HEAT

CROSS-REFERENCE TO RELATED APPLICATIONS

"Not Applicable"

STATEMENT REGARDING FEDERALLY SPONSORED RESEARCH OR DEVELOPMENT

"Not Applicable"

REFERENCE TO SEQUENCE LISTING, A TABLE, OR A COMPUTER PROGRAM LISTING COMPACT DISC APPENDIX

"Not Applicable"

BACKGROUND OF THE INVENTION

1. Technical Field

This invention relates generally to a food warmer that has heating capacity for multiple portions of foods that are heated in subdivided, individual sectioned compartments that rotates on a motorized turntable with ease of accessing the foods regulated by temperature controlled heat settings to keep the foods heated until served. The warmer has a two unit heating system that features an option of operating either one side of the warmer or the other side to accommodate any size group whether for the residential consumer or the commercial consumer.

2. Description of the Prior Art

The heating element system is by electricity or battery. The battery is rechargeable and the electric method has a 6' retractable cord connection. It has a two unit heating system that allows the left side only section or the right side only section to be heated with temperature controlled settings to regulate the heat. The turntable with connection by a motor and a switch control button that operates the start and stop rotation, will operate only when the entire, both sides, of the warmer are turned on with its individual switch control. Rotation of the turntable also allows ease of access to all selections of foods located in the mid-section area of the warmer. The motor is connected by a stem that is connected to a brace that is connected to, and operates, the turntable. The compartments are insulated, subdivided individual sectioned compartments, lifts out, have strainer tops and have holders for two serving spoons each to rest in on both sides of the compartments, front and back side of the warmer. Transparent dome shaped covers which cover the food sections of the warmer.

Presently, warming methods do not have multiple portions of foods in subdivided individual sectioned compartments so the foods are spread across a table in separate containers that could have more risk of safety by way of the heating methods, no guest may be seated at that location, long lines are formed, the precision of serving is more time consuming and there is no way of serving the foods without opening and closing a container before dishing out the next selection of food.

This invention of a food warmer to the residential consumer allows more safety because of its heating system of electric or battery elements so persons may sit or stand right at the location and not be at risk of flames, gas fumes, or hot water for heating. Foods may be served with ease of access to all selections of foods, no bowls need to be passed around, and food rotation allows all to be served to eat together. On the other hand, the commercial consumer may enjoy most of the same privileges as the residential consumers except on a larger scale and long lines maybe minimized. Rotation of the turntable will access the foods to be a time saver in its service. Customizing is done at the manufacture's stage so either consumer may customize their need.

BRIEF SUMMARY OF THE INVENTION

The object of this invention relates to a food warmer, lined to be cool to the touch has subdivided, individual sectioned compartments that holds multiple portions of foods that are rotated by a motorized turntable and is operated by electric or battery power. Foods are maintained by a temperature controlled heat settings that will allows the foods to remain heated until served. The two unit heating system has the option to use one side or both sides of the warmer independently to each other. The motorized turntable which is located in the mid-section of this heating area for the entrée and breads to rotate, will have restrictions of operation when the independent mode of operation for either sides being independently used, therefore, only one half of the turntable of foods will be available and is purposed to operate for convenience of any size group of people. The compartments, lifts out for refill and/or cleaning, they are all insulated and they all have transparent lid covers that a have storage space draw when taken off for serving.

DRAWING DESCRIPTIONS

Switch 1—a. operations the left one half of the heating section of the unit, b. operates the left one half of the bread compartments and c. operates the hot beverage area.

Switch 2—a. operates the right one half of the heating section of the unit and b. operates the right one half of the bread compartment Switch 3—a. operates the turntable—b. start and stop operation.

Figures 3, 4:
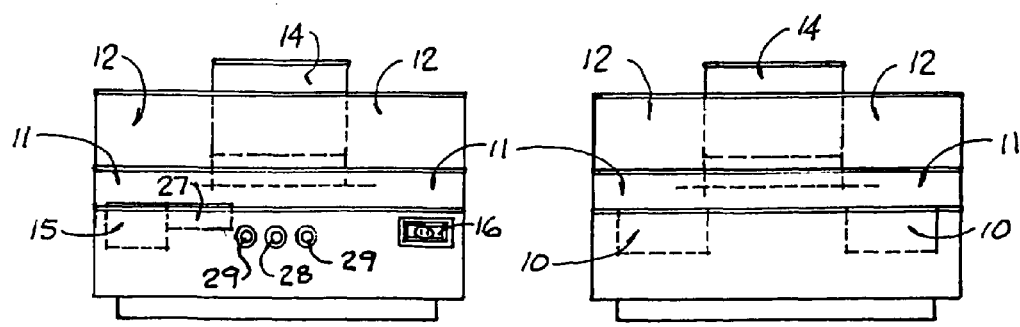
FIG. 3. Right elevation.

FIG. 4. a. Left elevation shows the non-heated area for cold beverages/options, b. the recessed napkin bin and c. shows retractable electrical cord.

DETAILED DESCRIPTION OF THE DRAWINGS

Figure 1:
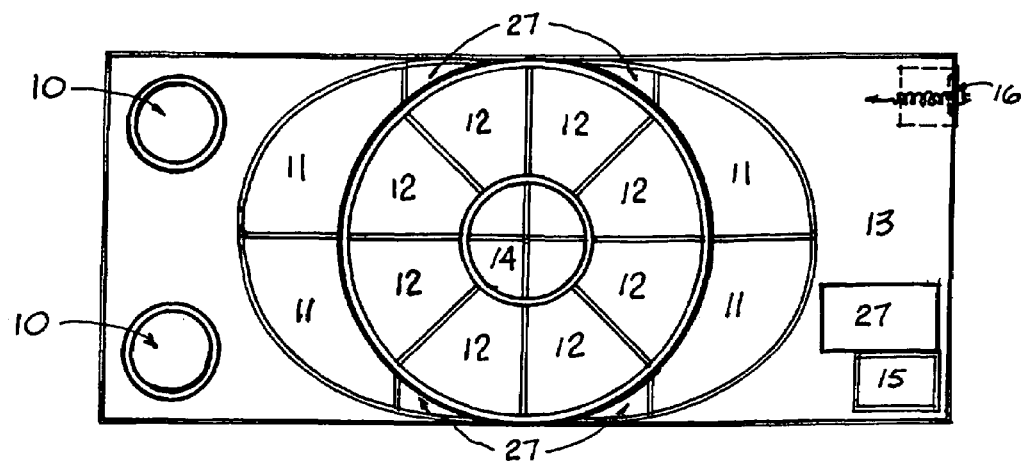
FIG. 1. a. Is a plan view that shows the hot beverage area, b. the meat compartments, c. the motorized turntable, d. the entrée and bread compartments, e. the non-heated area with a recessed napkin and utensil bins and f. the retractable, electricl plug.

FIG. 1) Referring to the drawings in Plan View, that shows the hot beverages area 10 that holds choice beverages. The oval section 11 is sub-divided into two sections on each side of the warmer with serving spoon holders 27 in the area that also surrounds 12 the motorized turntable which holds the sub-divided, individually sectioned compartments for the entrée and 14 the four sectioned compartments for the breads that are elevated slightly above the entrée sections that has rotation of each section. The non heated side of the warmer 13 is by choice a counter top work station to hold cold beverages, salads or choice of host for usage with 27 to hold extra utensils and 15 a napkin bin while 16 is a detachable/retractable electrical plug area.

Figure 2:
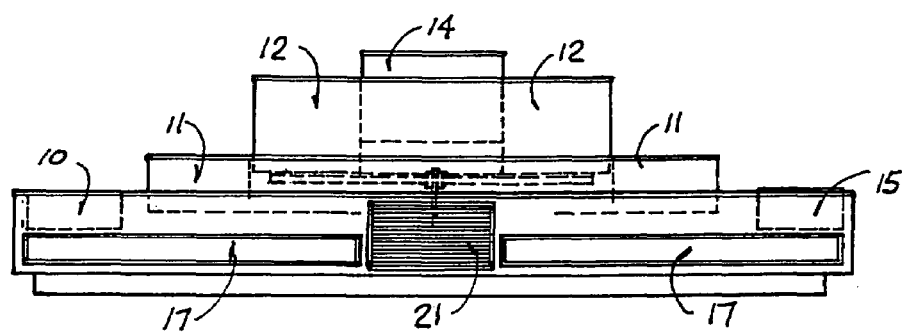
FIG. 2. a. Front elevation/rear without drawers and compartments, b. louvered vent for motor operation—front and rear elevations.

FIG. 2) This is the front/rear elevation view that shows the two (2) drawer spaces for storage without the drawers 17 and the casters and drawer guides 17 to pull in/out with the meat compartments 11, the entrée 12 and breads 14 sections in view and louvered vent 21 for the motor safety 18 front/rear. Also in View is the hot beverage area and the non-heated counter top area with the napkin bin 15.

FIG. 3) The right elevation shows the switch connections of switch 1, a–e; Switch 2, a–b; Switch 3, a–b; to operate both the right ½ and left ½ of the separate unit heating elements 24 of the typical section, pg. 2 of drawings. Switch 1*a*. operates the unit section of one side of the turntable 12 with ½ of the entrée compartments 12 and ½ of the bread compartments 14 plus ½ of the meat compartments 11 heated that is operated by the temperature gauge settings 29. Switch 2*a*. operates the right ½ of the unit section with ½ of the entrée compartments 12 and ½ of the bread compartments 14 plus ½ of the meat compartments 11 heated and operated by the temperature gauge settings 29 that extends to the meat section 11. Switch 3 operates the turntable 12 by 28 start and stop control button for both sides with motor 18 isometric section and rotary support 20 isometric section, pg. 2. Recessed napkin bin 15 and utensil bin 27 with 16 electric retractable cord plug location.

FIG. 4) the left elevation, a–c: a. shows the entrée area 12, b. the bread compartment area 14, the meat compartments 11, c. the hot beverage area 10.

FIG. 5) in the section view, pg. 2, a–f, you see the elevated progression of one side that shows: a. the hot beverage area 10, b. the meat compartments 11, c. the entrée compartments and turntable 12 supported by the turntable stem from motor 18 and turntable 20 motor power source. d. the bread compartments 14 (center) e. the other side of the entrée compartments 12, f. the meat compartments 11 and both sides of the drawer space 17 in view.

FIG. 6) the Isometric Section, pg. 2, a–g., shows: a. the hot beverage area 10, b. the linings 23 of the entrée compartments, c. 18 the motor turntable with the battery holder 20, d. holder for serving spoon 27, e. meat compartments 11, f. the recesed napkin holder 15 and g. the retractable electric cord connection 16.

FIG. 7) the Typical Section, pg. 2 shows—22 the side walls and the bottom insulations 23 compartment linings and 24 shows heating elements.

FIG. 8) the Lid Cover/Front/Rear View shows: the transparent covers 25 for all the compartment levels of the warmer.

FIG. 9) Lid Cover Side View shows: 25 sie view covers for compartments.

FIG. 10) Strainer Lifts shows: 26 the removable strainer and its lift for all compartments.

FIG. 11) Typical Strainers shows: view of strainers on all compartments 26.

DETAILED DESCRIPTION OF THE INVENTION

This invention is a food warmer that has subdivided individual sectioned compartments that holds multiple portions of foods that are rotated from the mid-section, the entrée and breads, the warmer is operated by a motorized turntable that rotates the foods for easy access. The heating element is electrical or battery power, that has a 6' retractable, detachable cord and a rechargeable battery. The separate two unit heating system allows an option to the warmer to heat each side of the warmer independently with restriction to the use of the turntable in the independent mode of operation. The temperature controlled settings regulates the heat to keep the required heating. The compartments have transparent lid covers, they lift out for refill and/or cleaning, they have removable strainer tops and serving spoon holders at each compartment ends. The meat compartments surround the mid-section of the turntable and are insulated. The base level of the warmer holds the hot beverages and on the non-heated side of the warmer holds the cold beverages and/or a counter top work section, which also holds the serving spoons and the recessed napkin bin in the same area. The motor and rotary support for rotation that rotates the mid-section, entrée and breads section, the two draw storage spaces that stores the lid covers of the compartments are housed at this level. Customized sizing for the residential or commercial consumer is available by the manufacture at their request.

What is claimed is:

1. A food warmer with a rotating section with elevated, insulated subdivided food compartments that keeps prepared foods warm while allowing ease of access to all selections of the food, with an area for hot beverages to be warned on a temperature controlled base unit, and a non-heat area for optional usage comprising:

rotating turntable in the mid-section of the warmer with a plurality of compartments, an insulated, non-rotating compartmented section surrounding the turntable and having a heating system for optional heating of both, and a base unit of the warmer, containing the motor and on which the rotating and non-rotating sections are mounted, and having a surface for keeping heated and non-heated foods and beverages.

2. The food warmer as recited in claim 1, further comprising strainer tops or lids for the removable compartments.

3. The food warmer as recited in claim 1, further comprising household or battery powered heater system, and a retractable or detachable power cord.

4. The food warmer as recited in claim 1, further comprising a heater system having two heating units independently controlled by temperature gauges, heating respective halves of the warmer.

5. The food warmer as recited in claim 1, wherein the base unit is rectangular.

6. The food warmer as recited in claim 1, wherein the base unit has heated ringed impression for hot beverages.

7. The food warmer as recited in claim 1, wherein the non-rotating compartmented section surrounding the turntable is oval shaped and has compartments for serving utensils.

8. The food warmer as recited in claim 1, wherein the base unit has a non-heated section with bins for silverware and napkins.

9. The food warmer as recited in claim 1, wherein the turntable is motorized and operated by a start and stop switch.

10. The food warmer as recited in claim 9, further comprising vents in the base to allow cooling of the turntable motor.

11. The food warmer as recited in claim 1, wherein the base unit has a least one storage drawer.

12. The food warmer as recited in claim 1, wherein the turntable has upper and base level lift-out compartments and insulated walls.

* * * * *